US010306209B2

(12) United States Patent
Ko et al.

(10) Patent No.: US 10,306,209 B2
(45) Date of Patent: May 28, 2019

(54) ILLUMINATOR FOR CAMERA SYSTEM HAVING THREE DIMENSIONAL TIME-OF-FLIGHT CAPTURE WITH MOVABLE MIRROR ELEMENT

(71) Applicant: Google LLC, Mountain View, CA (US)

(72) Inventors: Jamyuen Ko, San Jose, CA (US); Chung Chun Wan, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/816,112

(22) Filed: Nov. 17, 2017

(65) Prior Publication Data

US 2018/0077406 A1   Mar. 15, 2018

Related U.S. Application Data

(63) Continuation of application No. 14/580,053, filed on Dec. 22, 2014, now Pat. No. 9,854,226.

(51) Int. Cl.

| | |
|---|---|
| *G01S 17/89* | (2006.01) |
| *G01S 7/481* | (2006.01) |
| *H04N 5/225* | (2006.01) |
| *H04N 13/254* | (2018.01) |
| *H04N 13/286* | (2018.01) |
| *H04N 13/296* | (2018.01) |

(52) U.S. Cl.
CPC ......... *H04N 13/254* (2018.05); *G01S 7/4815* (2013.01); *G01S 7/4817* (2013.01); *G01S 17/89* (2013.01); *H04N 13/286* (2018.05); *H04N 13/296* (2018.05); *H04N 5/2256* (2013.01); *H04N 2213/001* (2013.01)

(58) Field of Classification Search
CPC .. H04N 13/254; H04N 13/296; H04N 13/286; H04N 2213/001; H04N 5/2256; G01S 7/4817; G01S 7/4815; G01S 17/89

USPC .......................................................... 348/46
See application file for complete search history.

(56) References Cited

U.S. PATENT DOCUMENTS

| | | | |
|---|---|---|---|
| 5,208,703 A | 5/1993 | Ikegame et al. |
| 5,912,608 A | 6/1999 | Asada |
| 6,028,689 A | 2/2000 | Michaelicek et al. |
| 6,067,059 A | 5/2000 | Chen |
| 6,157,387 A | 12/2000 | Kitani |
| 7,936,038 B2 | 5/2011 | Jeong et al. |
| 7,990,636 B2 | 8/2011 | Park et al. |

(Continued)

FOREIGN PATENT DOCUMENTS

| | | |
|---|---|---|
| CN | 102495512 A | 6/2012 |
| CN | 102947726 A | 2/2013 |

(Continued)

OTHER PUBLICATIONS

'gamasutra.com' [online] "The Science Behind Kinects or Kinect 1.0 versus 2.0," Daniel Lau, Nov. 27, 2013, [retrieved on Feb. 28, 2018] Retrieved from Internet: URL< https://www.gamasutra.com/blogs/DanielLau/20131127/205820/The_Science_Behind_Kinects_or_Kinect_10_versus_20.php> 7 pages.

(Continued)

*Primary Examiner* — Jared Walker
(74) *Attorney, Agent, or Firm* — Fish & Richardson P.C.

(57) ABSTRACT

An apparatus is described that includes a camera system having a time-of-flight illuminator. The time of flight illuminator has a light source and one or more tiltable mirror elements. The one or more tiltable mirror elements are to direct the illuminator's light to only a region within the illuminator's field of view.

17 Claims, 18 Drawing Sheets

(56) References Cited

U.S. PATENT DOCUMENTS

Figure 1B:
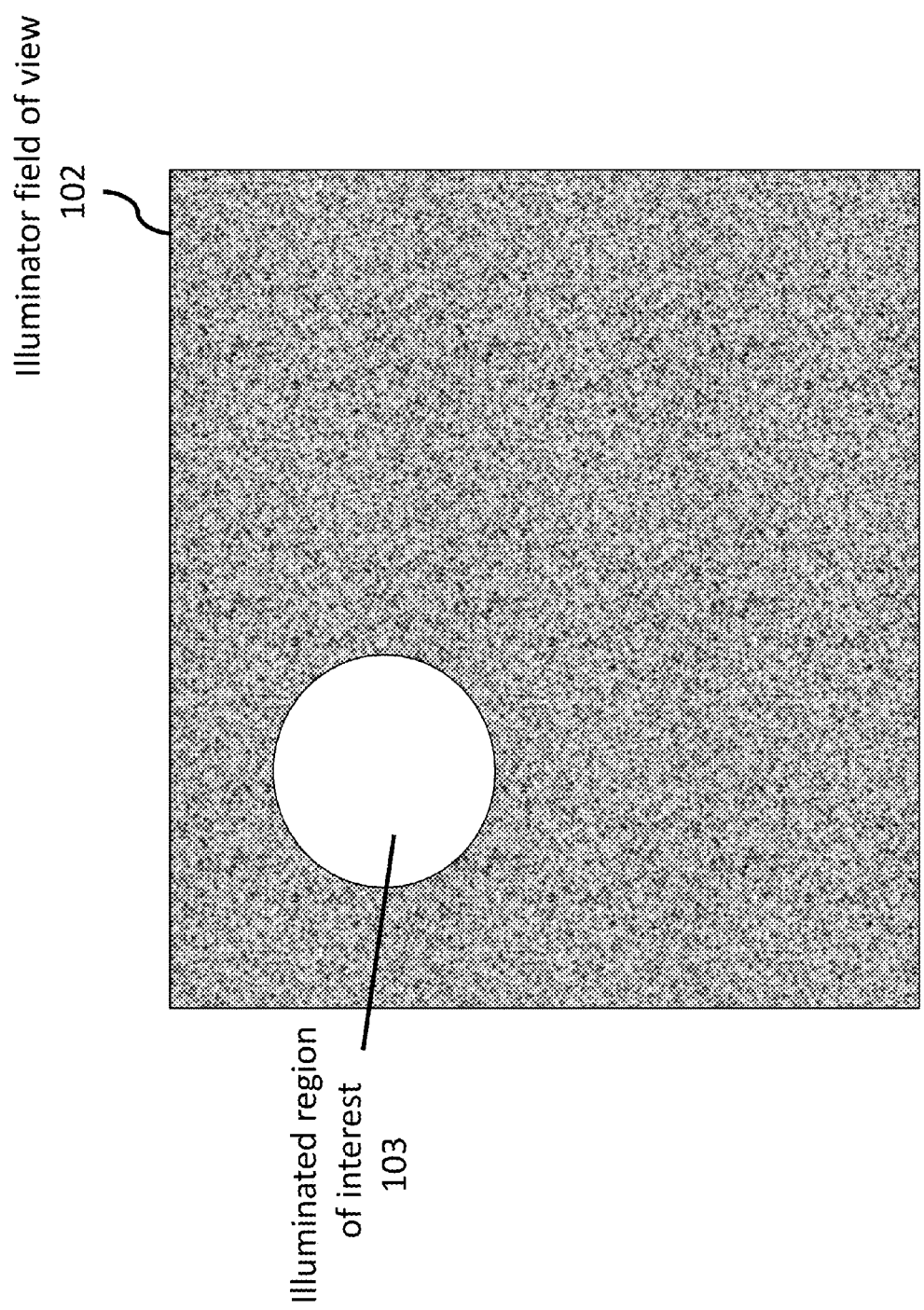

| | | | |
|---|---|---|---|
| 8,027,107 B2 | 9/2011 | Hwang et al. |
| 8,116,018 B2 | 2/2012 | Park et al. |
| 8,134,637 B2 | 3/2012 | Rossbach et al. |
| 8,159,762 B2 | 4/2012 | Lim et al. |
| 8,218,016 B2 | 7/2012 | Park et al. |
| 8,761,594 B1 | 6/2014 | Gross et al. |
| 2002/0050744 A1 | 5/2002 | Bernstein et al. |
| 2003/0197910 A1 | 10/2003 | Witt et al. |
| 2006/0176468 A1 | 8/2006 | Anderson |
| 2006/0269896 A1 | 11/2006 | Liu et al. |
| 2007/0176090 A1 | 8/2007 | Verentchikov |
| 2009/0195790 A1 | 8/2009 | Zhu et al. |
| 2011/0194007 A1 | 8/2011 | Kim et al. |
| 2011/0222040 A1 | 9/2011 | Steinhoff |
| 2011/0254928 A1 | 10/2011 | Meinherz |
| 2012/0274921 A1 | 11/2012 | Lai |
| 2013/0226859 A1 | 1/2013 | Bae et al. |
| 2013/0131836 A1 | 5/2013 | Katz et al. |
| 2013/0134470 A1 | 5/2013 | Shin et al. |
| 2013/0163627 A1 | 6/2013 | Seurin et al. |
| 2013/0188022 A1 | 7/2013 | Katz et al. |
| 2013/0201292 A1 | 8/2013 | Walter et al. |
| 2013/0206967 A1 | 8/2013 | Shpunt et al. |
| 2014/0049610 A1 | 2/2014 | Hudman et al. |
| 2014/0055771 A1 | 2/2014 | Oggier |
| 2014/0063261 A1 | 3/2014 | Betensky |
| 2014/0160493 A1 | 6/2014 | McEldowney |
| 2014/0176663 A1 | 6/2014 | Cutler et al. |
| 2014/0211193 A1 | 7/2014 | Bloom et al. |
| 2014/0307239 A1 | 10/2014 | Bach et al. |
| 2014/0340484 A1 | 11/2014 | Pfister |

FOREIGN PATENT DOCUMENTS

| | | |
|---|---|---|
| CN | 103038664 A | 4/2013 |
| CN | 103502121 A | 1/2014 |
| CN | 104132639 A | 11/2014 |
| CN | 104160240 A | 11/2014 |
| EP | 1221582 | 7/2002 |
| JP | 2005/077443 | 3/2005 |
| KR | 10-2014-0028536 | 3/2014 |
| TW | 201243287 A | 11/2012 |
| WO | WO 2007/025362 | 3/2007 |
| WO | WO 2012/013536 | 2/2012 |
| WO | WO 2013/121366 | 8/2013 |
| WO | WO 2014/125272 | 8/2014 |

OTHER PUBLICATIONS

'newatlas.com' [online] Hands-on with the Creative Senz3D, Adam Williams, Sep. 6, 2013, [retrieved on Mar. 13, 2018] Retrieved from Internet: URLhttps://newatlas.com/hands-on-with-the-creative-senz3d/28975/> 27 pages.
'www.adept.net.au' [online] "SR4500 Data Sheet," Mesa Imaging, Available on or before Apr. 4, 2015, [retrieved on Mar. 13, 2018] Retrieved from Internet: URL< http://www.adept.net.au/cameras/Mesa/pdf/SR4500.pdf> 4 pages.
'www.adept.net.au' [online] "Swiss Ranger SR4000," Available on or before Mar. 25, 2012 [retrieved on Mar. 14, 2018] Retrieved from Internet: URL< http://www.adept.net.au/cameras/Mesa/SR4000.shtml> 4 pages.
'www.blogs.micrsoft.com' [online] "Collaboration, expertise produce enhanced sensing in Xbox One," Jeffery Meisner, Oct. 2, 2013, [retrieved on Mar. 15, 2018] Retrieved from Internet: URL< https://blogs.microsoft.com/blog/2013/10/02/collaboration-expertise-produce-enhanced-sensing-in-xbox-one/> 11 pages.
'www.bloomberg.com' [online] "Sony's Big Bet on 3D Sensors that can See the World," Yuji Nakamura, Oct. 25, 2017, [retrieved on Feb. 27, 2018] Retrieved from Internet: URL< https://www.bloomberg.com/news/articles/2017-10-24/sony-s-big-bet-on-sensors-that-can-see-the-world> 6 pages.
'www.electronicdesign.com' [online] "How Microsogt's PrimseSense-based Kinect Really Works," William Wong, Mar. 16, 2011, [retrieved on Feb. 28, 2018] Retrieved from Internet: URL< http://www.electronicdesign.com/embedded/how-microsoft-s-primesense-based-kinect-really-works> 15 pages.
'www.engadget.com' [online] "Intel announces Creative Senz3D Peripheral Camera at Computex 2013," Myriam Joire, Jun. 4, 2013, [retrieved on Mar. 13, 2018] Retrieved from Internet URL<https://www.engadget.com/2013/06/04/intel-announces-creative-depth-vision-camera-at-computex-2013/> 9 pages.
'www.roborealm.com' [online] "Creative Senz3D," Available on or before Feb. 7, 2015, [retrieved on Mar. 12, 2018] Retrieved from Internet: URL<http://www.roborealm.com/help/Creative_Senz3D.php> 6 pages.
'www.sony.net' [online[ "Sony Develops Back-Illuminated Time-of-Flight Image Sensor with the Industry's Smallest Pixel Pitch," Jun. 5, 2017, [retrieved on Feb. 21, 2018] Retrieved from Internet: URL< https://www.sony.net/SonyInfo/News/Press/201706/17-059E/index.html> 4 pages.
'www.sony.net' [online] "Sony Releases a Back-Illuminated Time-of-Flight Image Sensor," Dec. 19, 2017, [retrieved on Feb. 21, 2018] Retrieved from Internet: URL< https://www.sony.net/SonyInfo/News/Press/201712/17-114E/index.html> 4 pages.
'www.sony-depthsensing.com' [online] "SoftKinetic D S525 Datasheet Short Range Module," Available on or before Dec. 30, 2013, [retrieved on Mar. 19, 2018] Retrieved from Internet: URL< https://www.sony-depthsensing.com/Portals/0/Documents/PDF/WEB_20131230_SK_DS525_Datasheet_V2.1.pdf> 2 pages.
'www.ti.com' [online] "OPT8241 3D Time-of-Flight (ToF) Sensor Evaluation Module," Available on or before Feb. 2, 2017, [retrieved on Mar. 14, 2018] Retrieved from Internet: URL< http://www.ti.com/tool/OPT8241-CDK-EVM#technicaldocuments> 3 pages.
Horaud et al. "An Overview of Depth Cameras and Range Scanners Based on Time-of-Flight Technologies," Machine Vision and Applications Journal, 27(7), Oct. 1, 2016, 18 pages.
Laukkanen. "Performance Evaluation of Time-of-Flight Depth Cameras," Theses submitted for Examination for the degree of Master of Science in Technology, Alto University School of Electrical Engineering, Nov. 23, 2015, 61 pages.
Li. "Time-of-Flight Camera—An Introduction," Texas Instruments Technical White Paper, SLOA190B, Jan. 2014, revised May 2014, 10 pages.
Pr Newswire "SoftKinetic Provides 3D Imaging Solution for Intel All-in-One Computer Reference Design," Sep. 12, 2013, 2 pages.
Sarbolandi et al. "Kinect Range Sensing: Structured-Light versus Time-of-Flight Kinect," arXiv 1505.05459v1, May 20, 2015, 58 pages.
Extended European Search Report issued in European Application No. 15873939.1, dated Jun. 20, 2018, 7 pages.
Extended European Search Report issued in European Application No. 18158472.3, dated Jun. 20, 2018, 8 pages.
CN Office Action issued in Chinese Application No. 201580035674.8, dated Nov. 27, 2018, 11 pages (English translation).
PCT/US2015/061633—International Search Report and Written Opinion, dated Mar. 11, 2016, 13 pages.
International Preliminary Report on Patentability issued in International Application No. PCT/US2015/061633, dated Jul. 6, 2017, 10 pages.

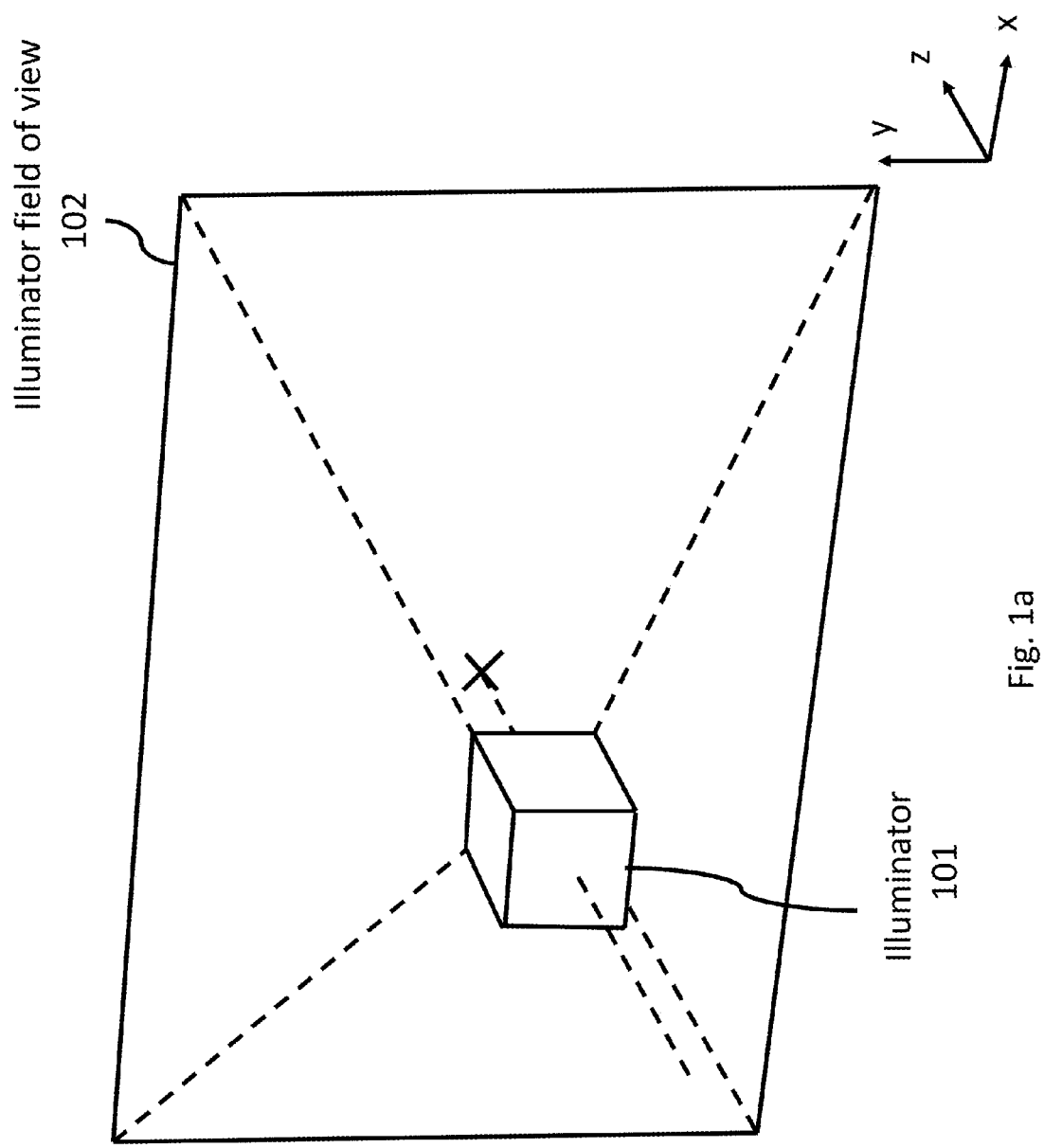

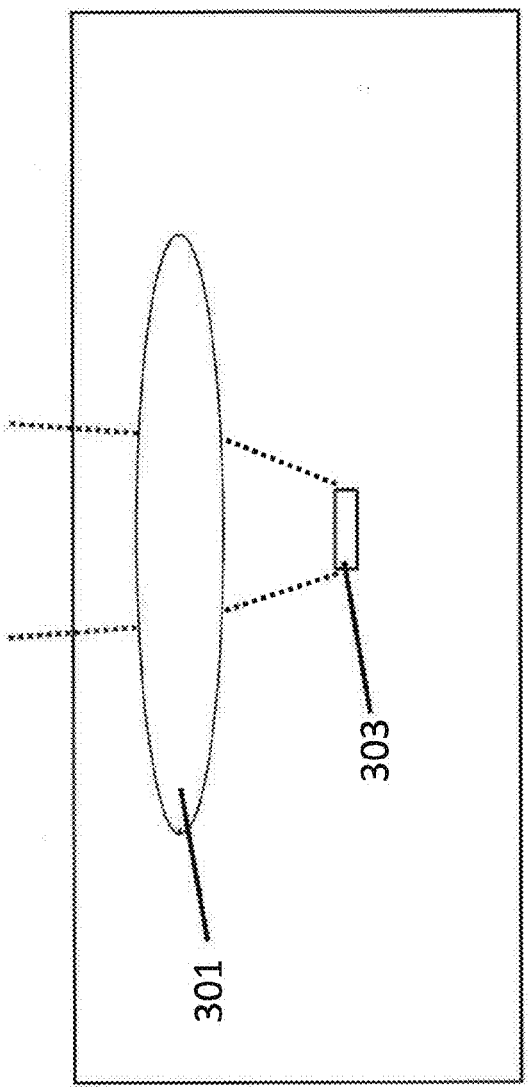
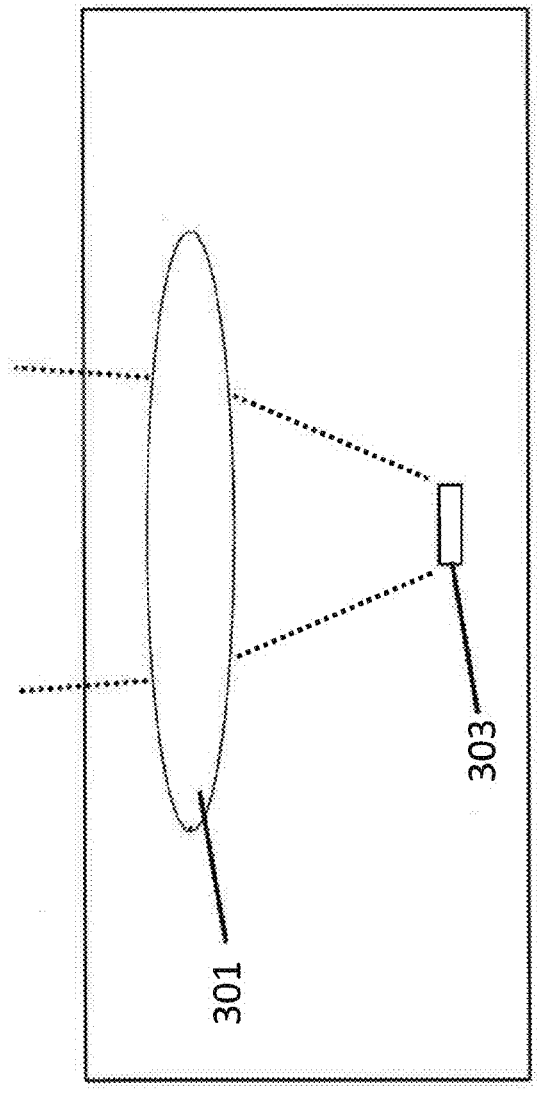

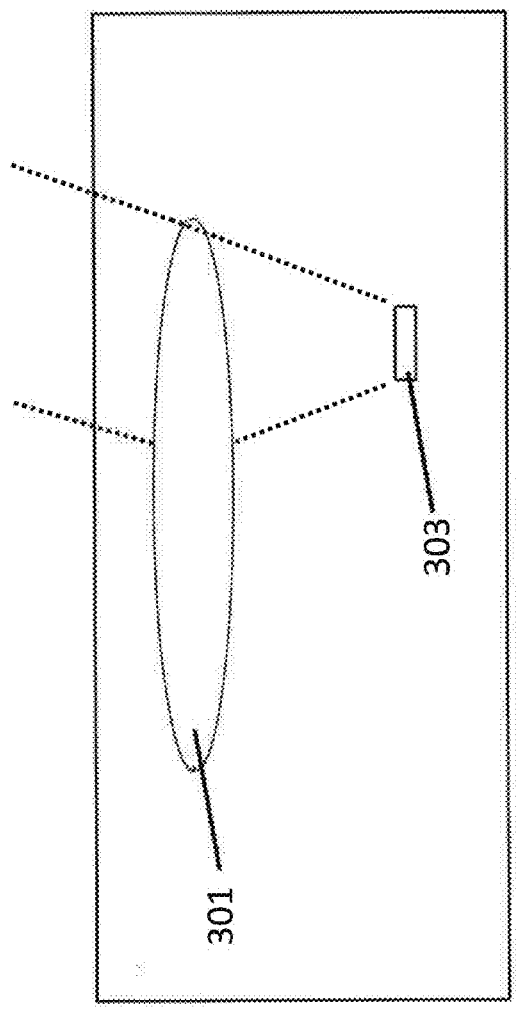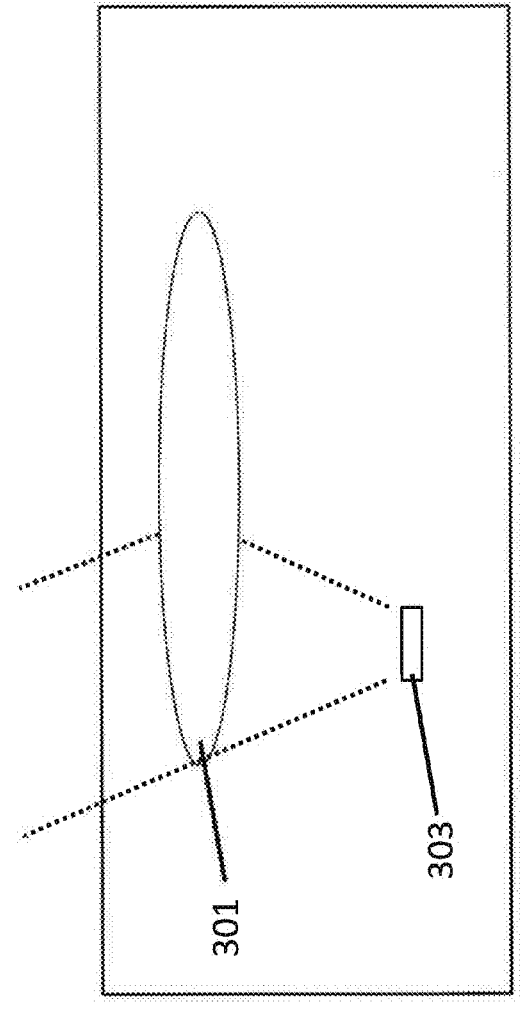

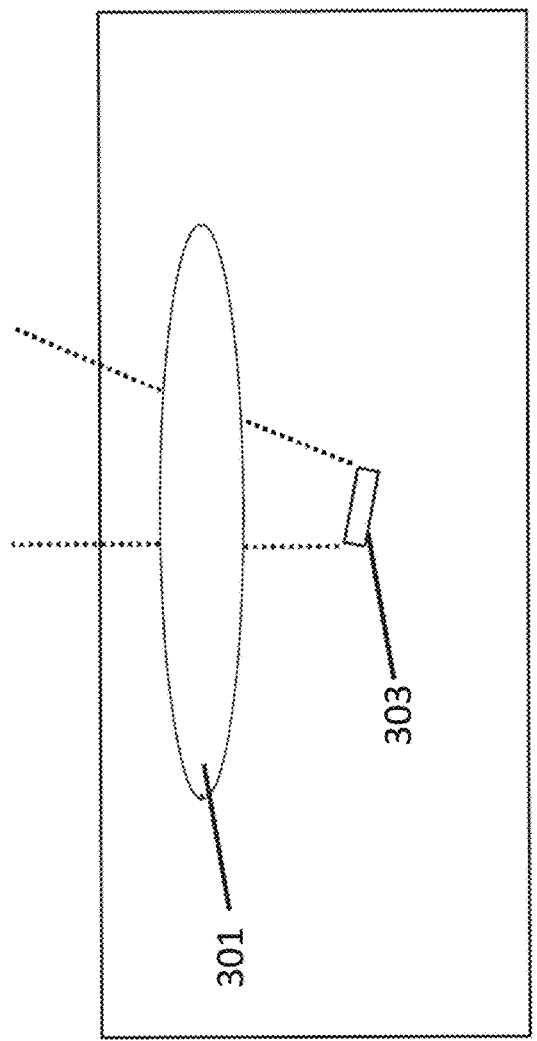
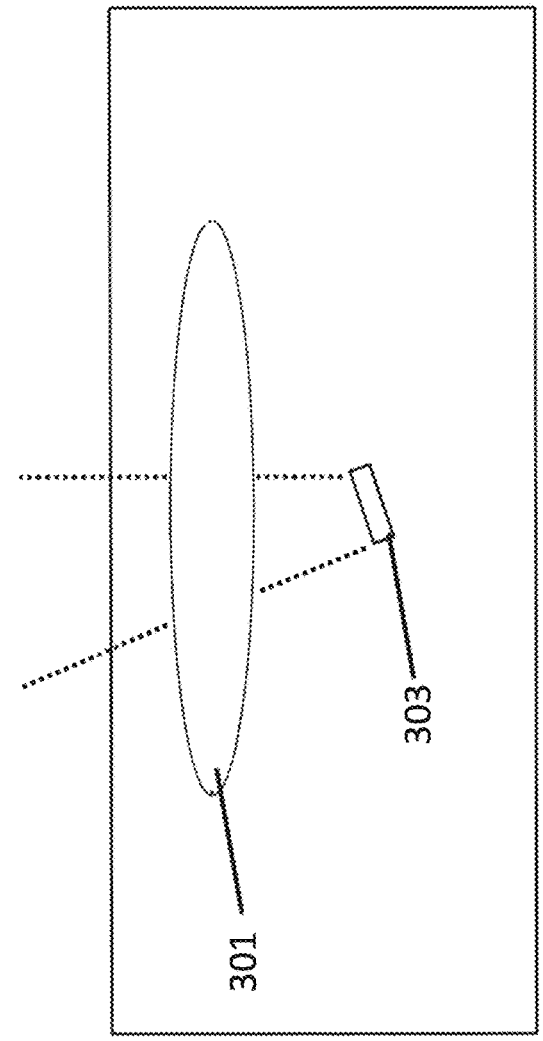

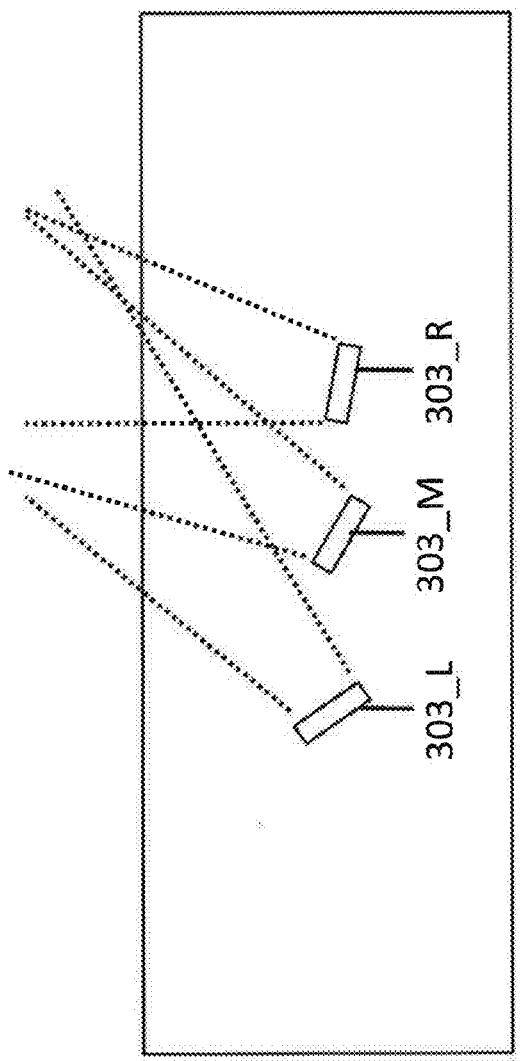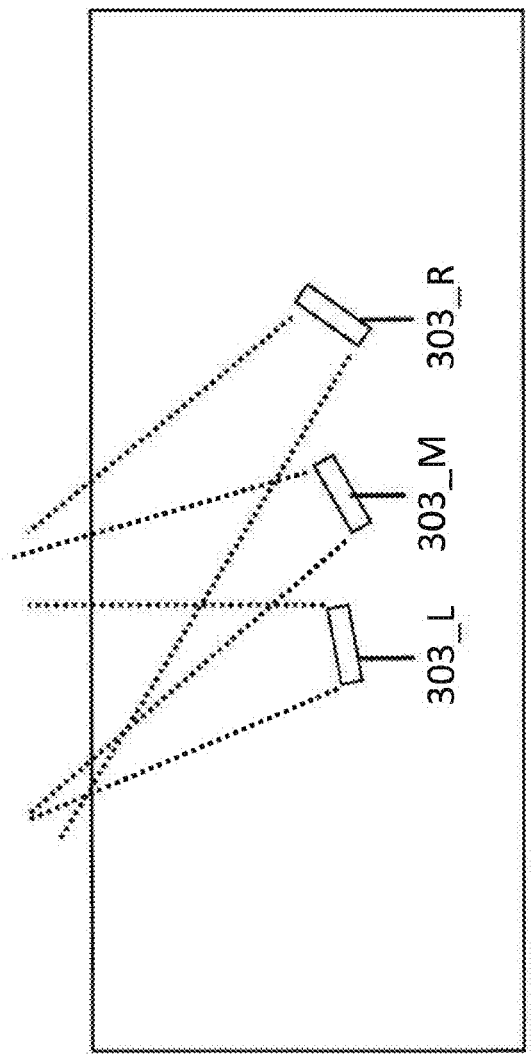

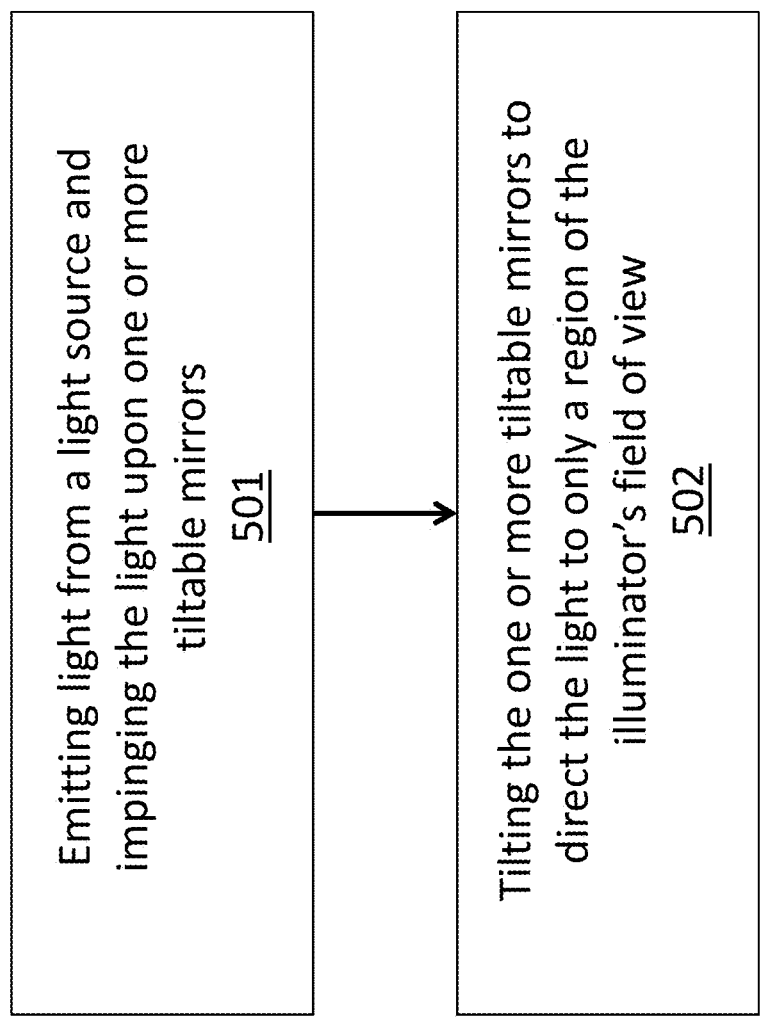

ILLUMINATOR FOR CAMERA SYSTEM HAVING THREE DIMENSIONAL TIME-OF-FLIGHT CAPTURE WITH MOVABLE MIRROR ELEMENT

RELATED APPLICATIONS

This application is a continuation of U.S. application Ser. No. 14/580,053, filed Dec. 22, 2014, the contents of which is hereby incorporated by reference.

FIELD OF INVENTION

The field of invention pertains generally to computing system peripherals, and, more specifically, to an illuminator for a camera system having three dimensional time-of-flight capture with a movable mirror element.

BACKGROUND

Many existing computing systems include a traditional camera as an integrated peripheral device. A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

One depth information capturing approach, referred to as "time-of-flight" imaging, emits light from a system onto an object and measures, for each of multiple pixels of an image sensor, the time between the emission of the light and the reception of its reflected image upon the sensor. The image produced by the time of flight pixels corresponds to a three-dimensional profile of the object as characterized by a unique depth measurement (z) at each of the different (x,y) pixel locations.

As many computing systems with imaging capability are mobile in nature (e.g., laptop computers, tablet computers, smartphones, etc.), the integration of a light source ("illuminator") into the system to achieve "time-of-flight" operation presents a number of design challenges such as cost challenges, packaging challenges and/or power consumption challenges.

SUMMARY

An apparatus is described that includes a camera system having a time-of-flight illuminator. The time of flight illuminator has a light source and one or more tiltable mirror elements. The one or more tiltable mirror elements are to direct the illuminator's light to only a region within the illuminator's field of view.

An apparatus is described having a time-of-flight camera system illuminator that includes first means for emitting light from a light source and impinging said light upon one or more tiltable mirrors. The illuminator also includes second means for tilting said one or more tiltable mirrors to direct said light to only a region of said illuminator's field of view.

FIGURES

Figure 1C:
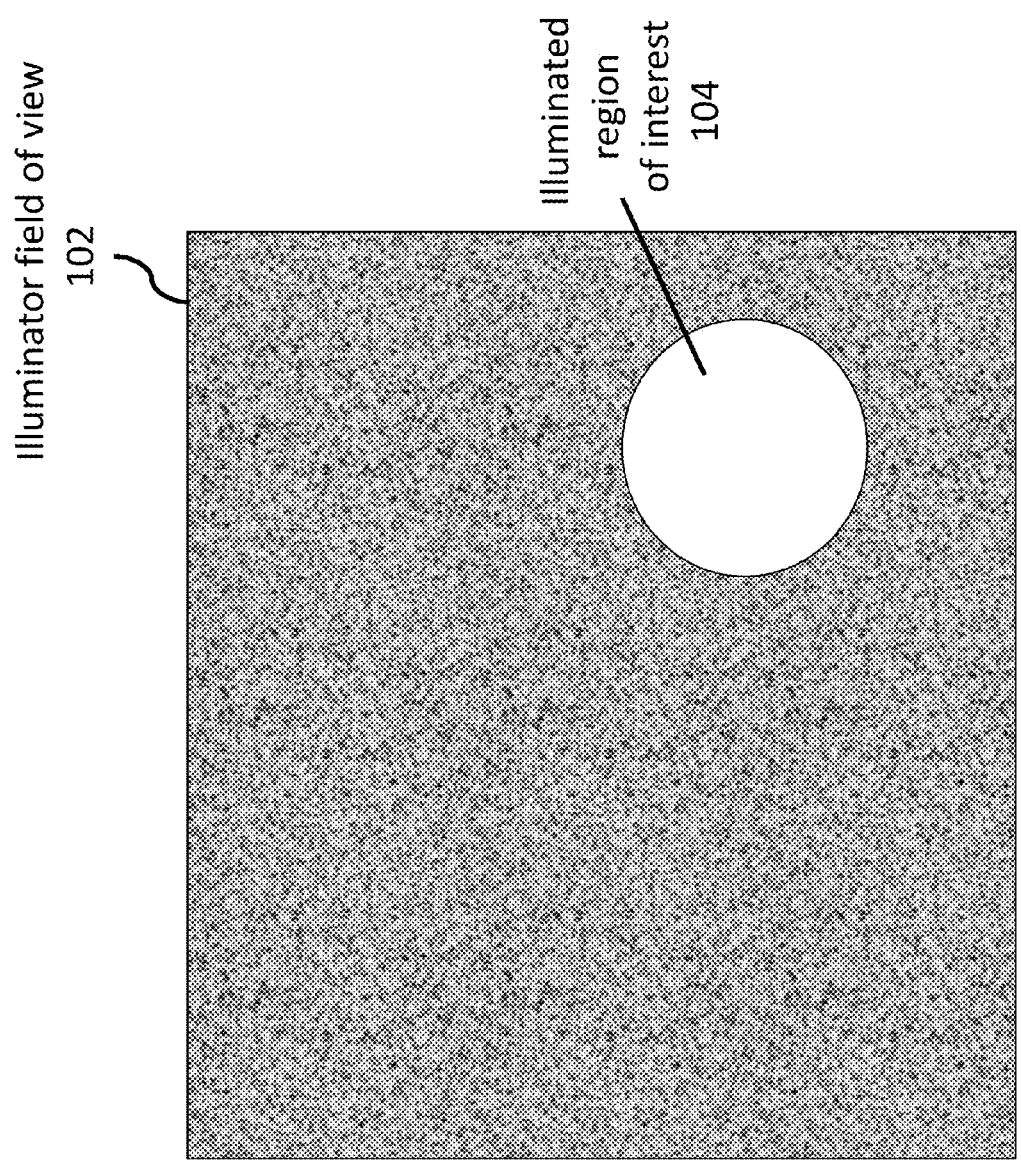
Figure 1D:
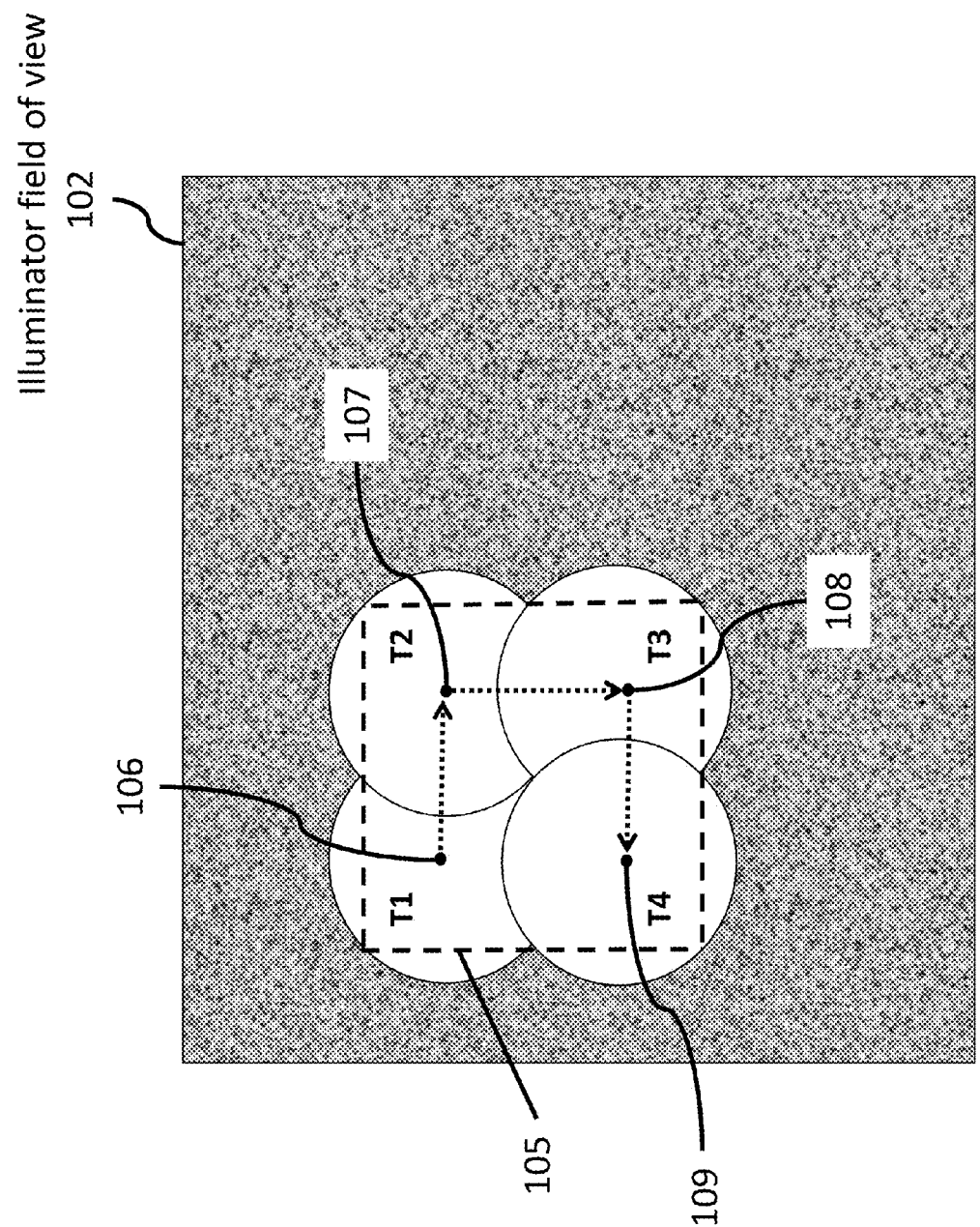
Figure 1E:
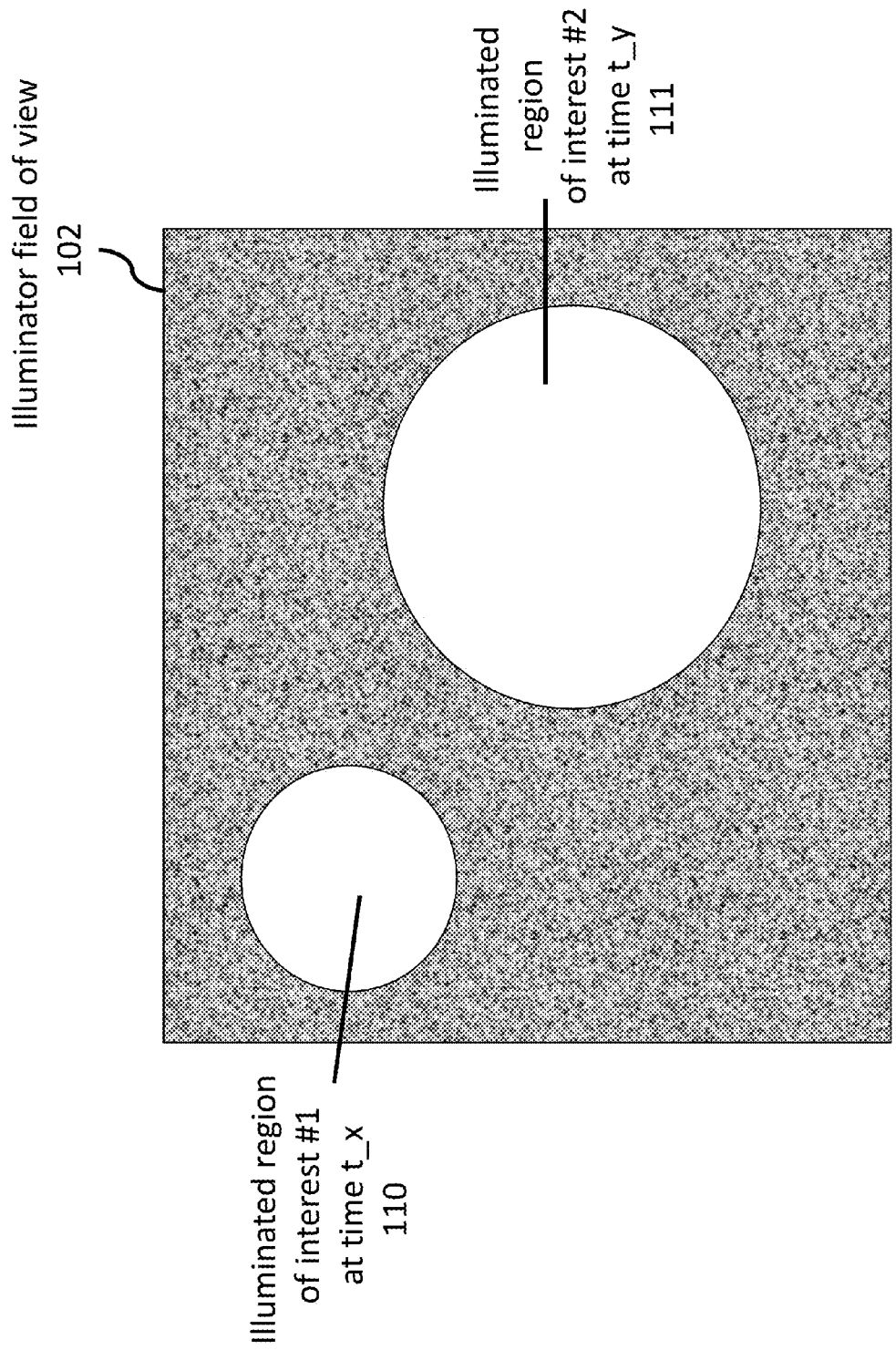
Figure 2A:
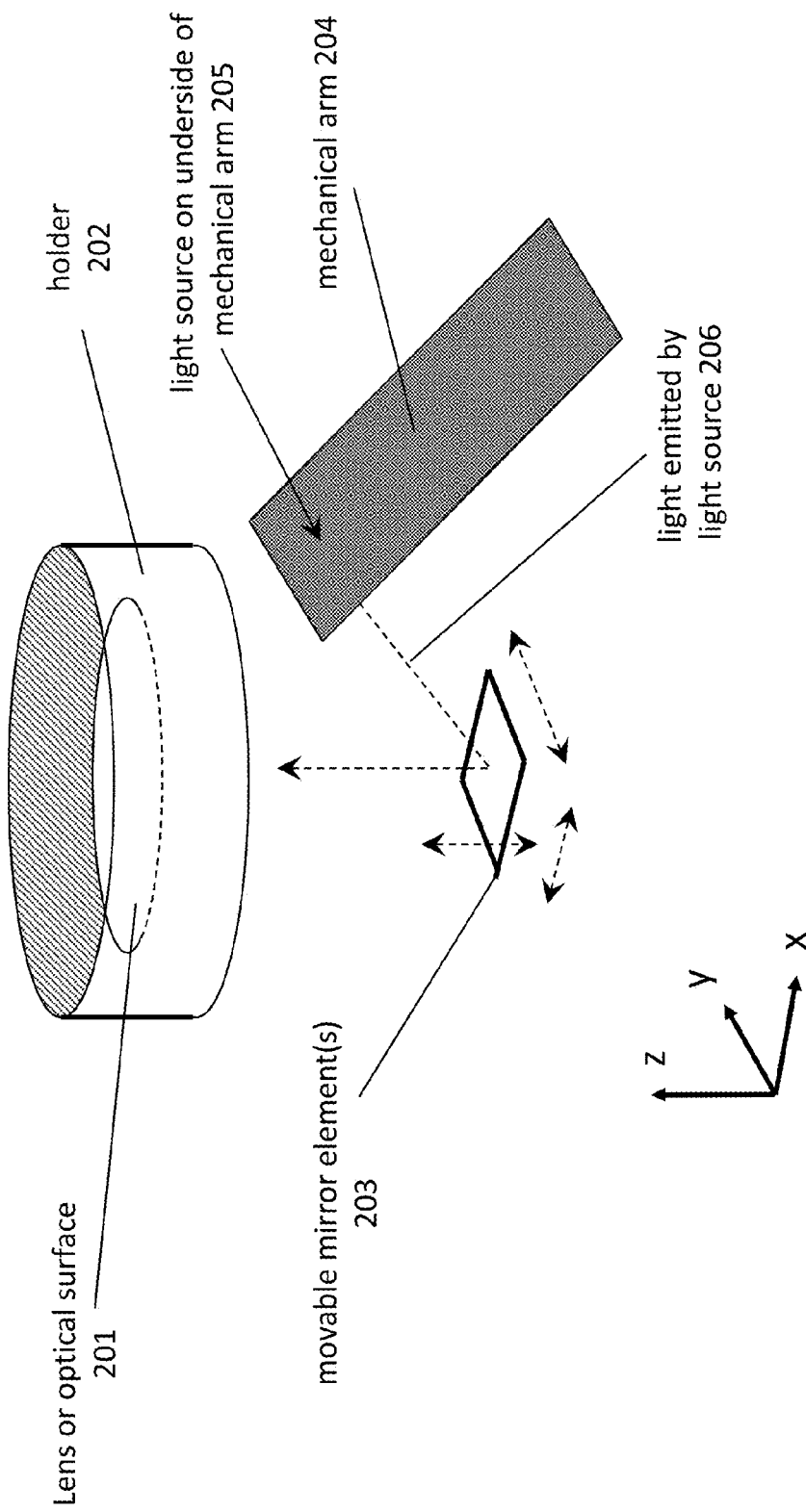
Figure 2B:
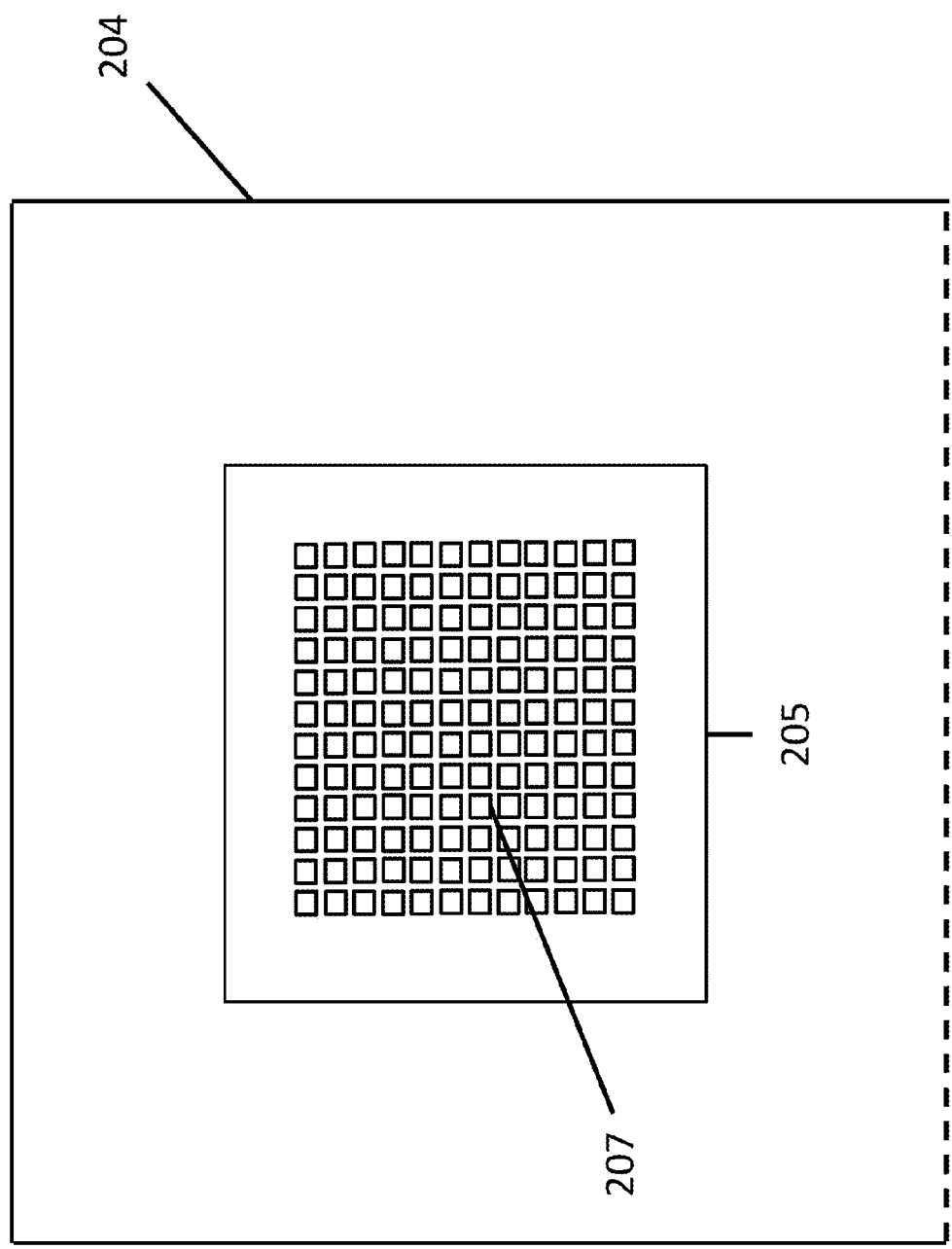
Figure 4A:
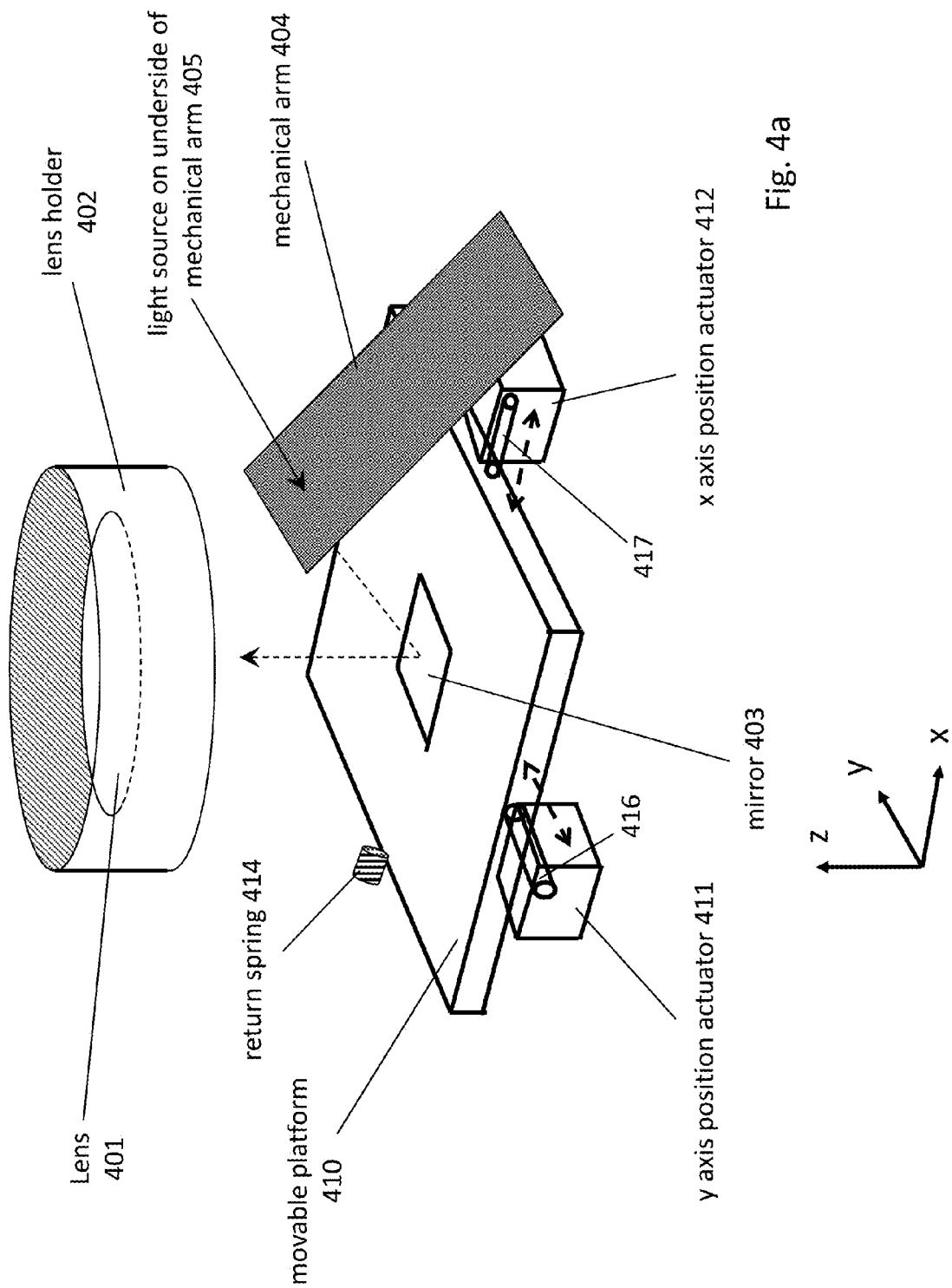
Figure 4B:
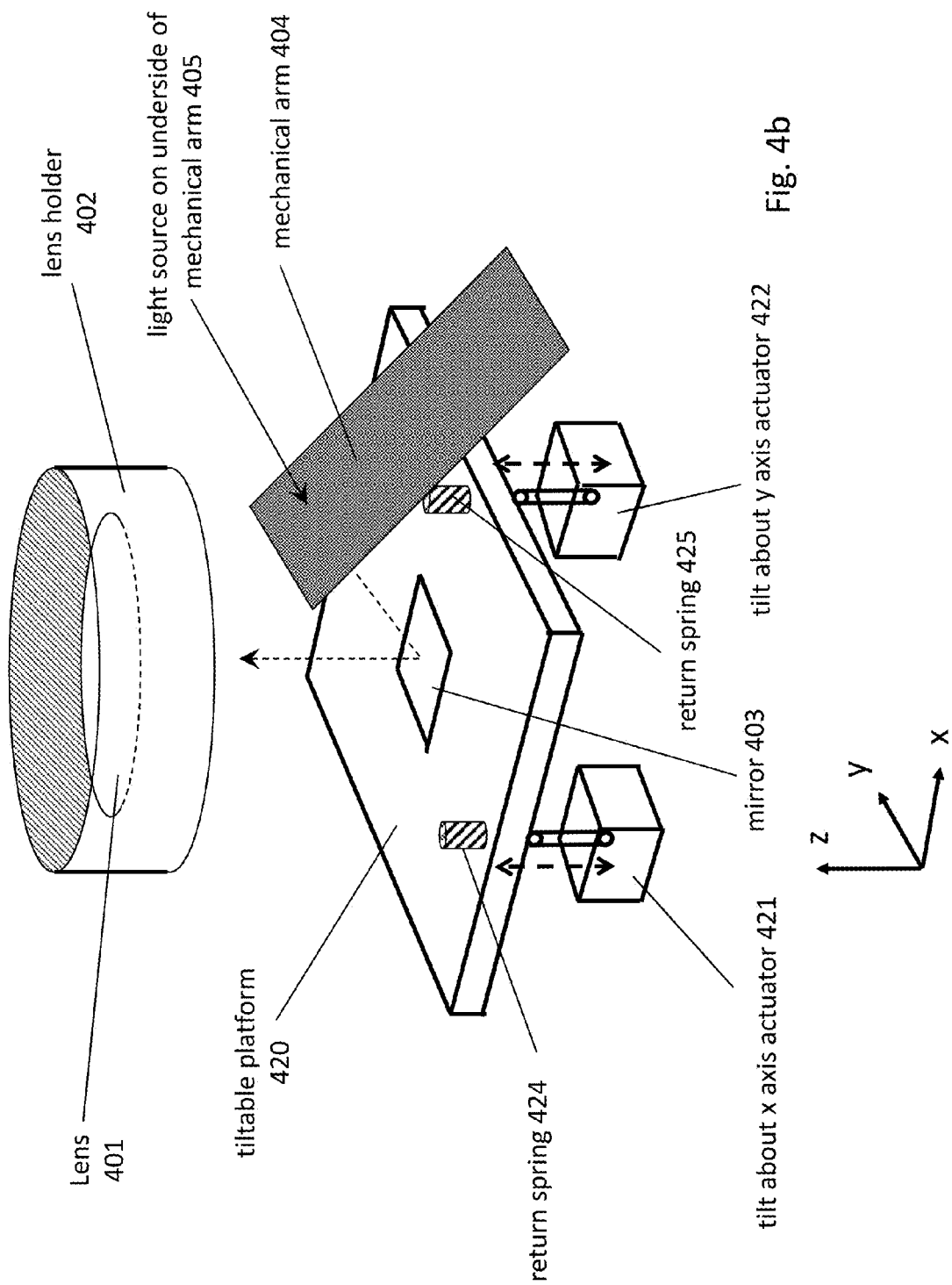
Figure 4C:
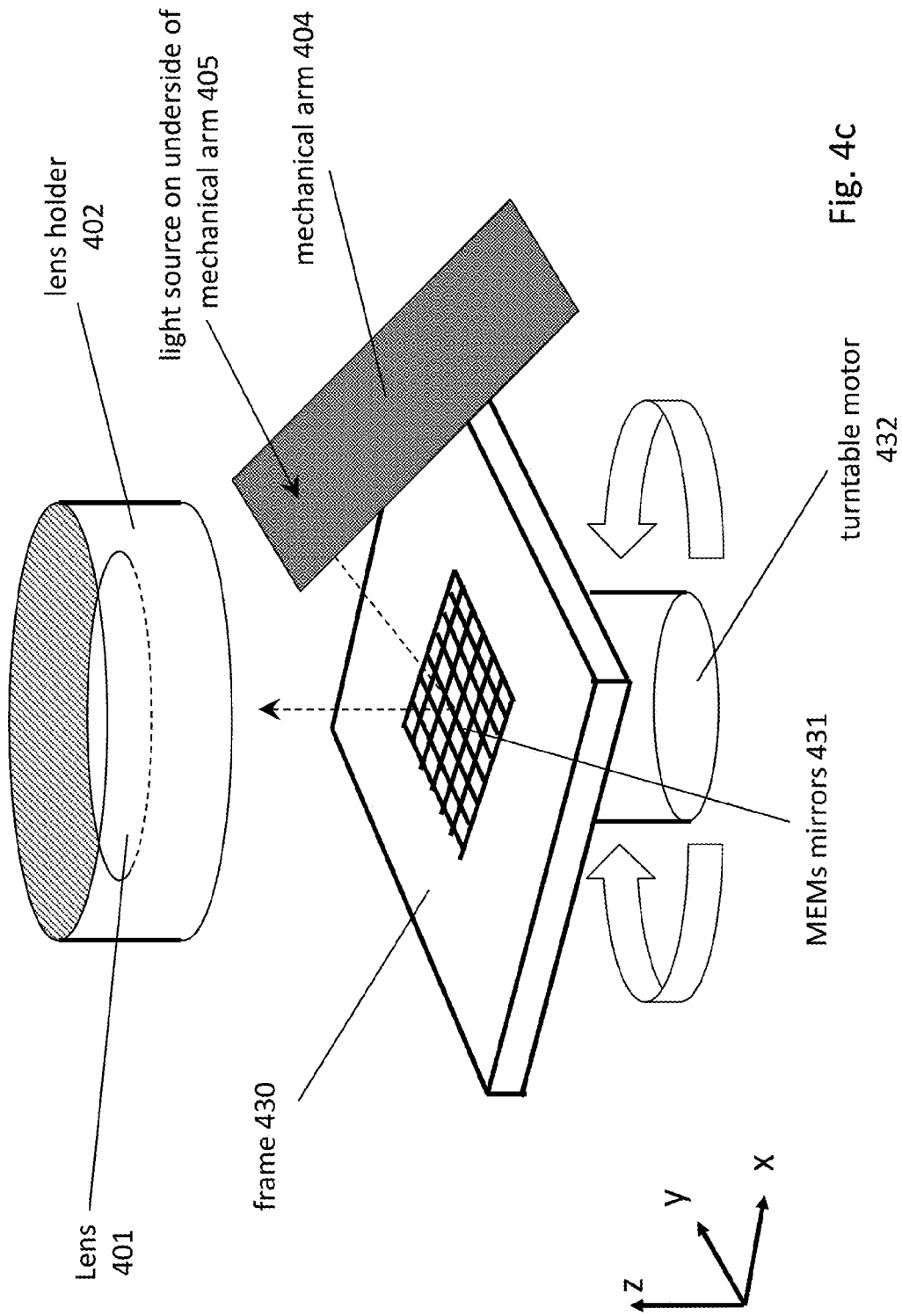
Figure 6A:
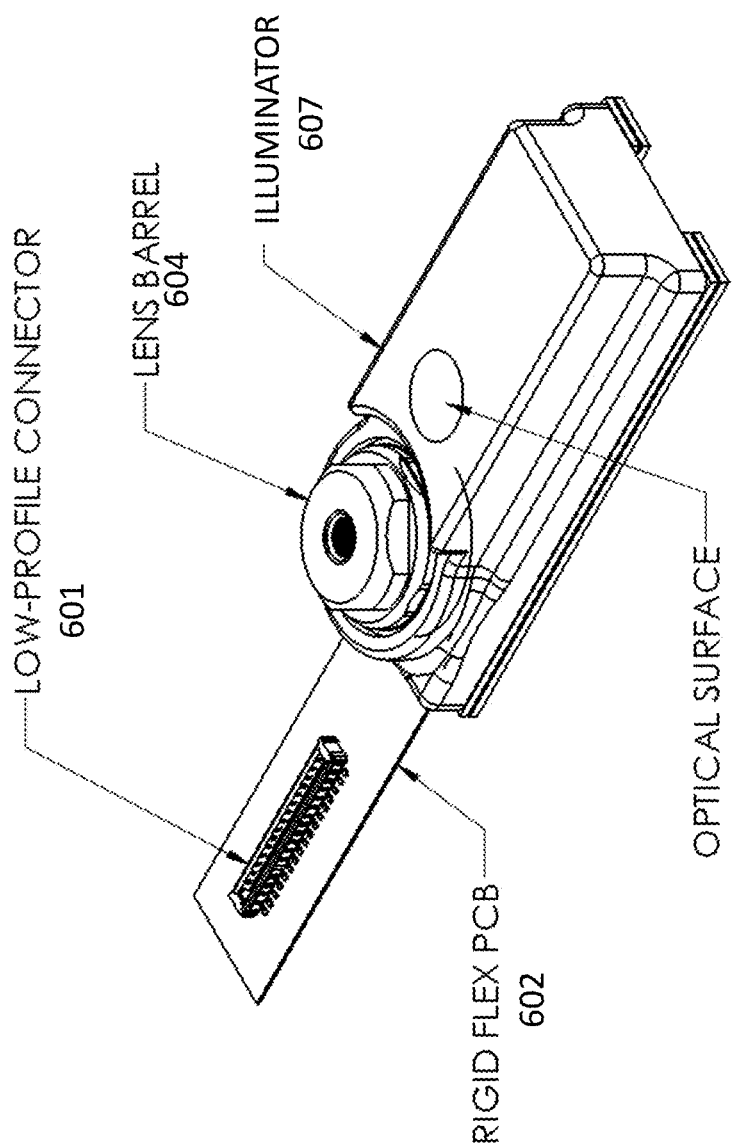
Figure 6B:
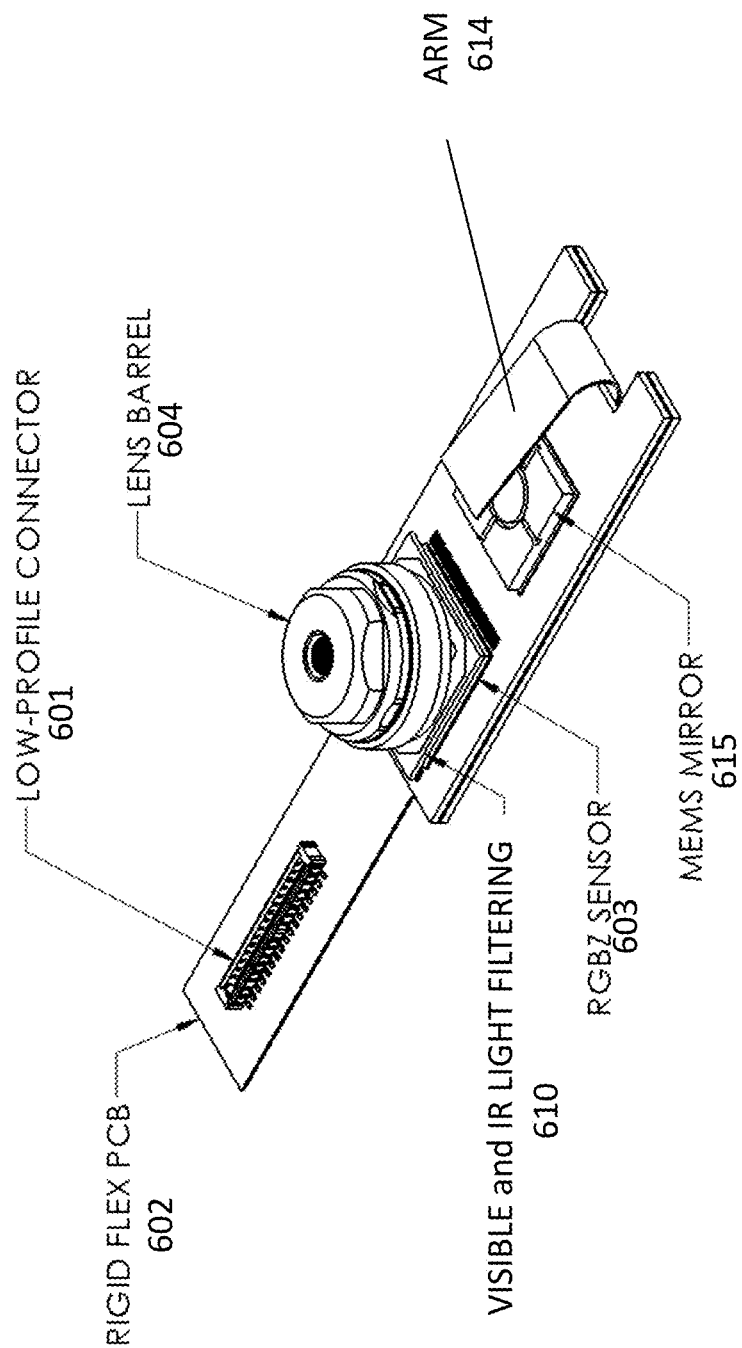
Figure 7:
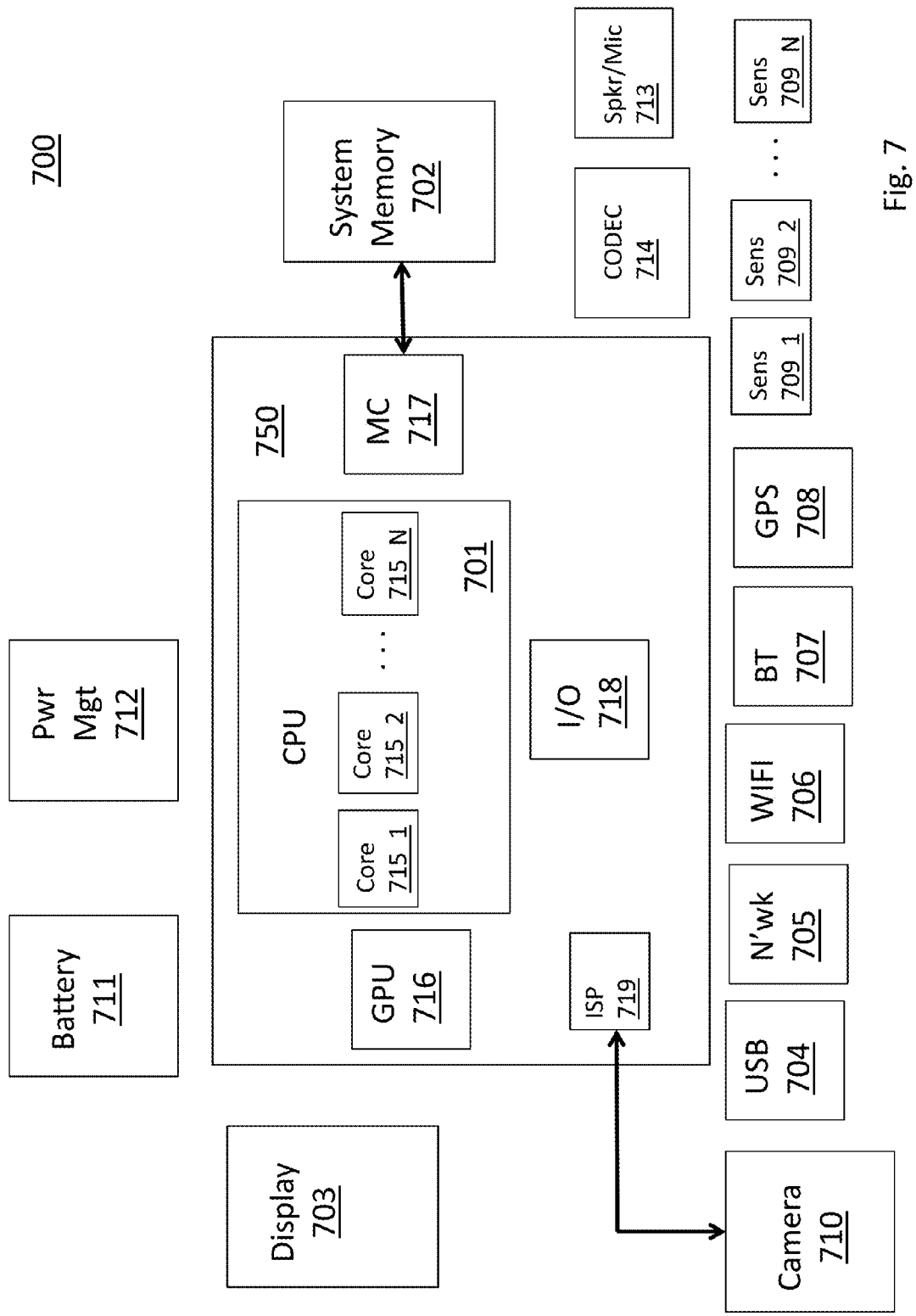

The following description and accompanying drawings are used to illustrate embodiments of the invention. In the drawings:

FIG. 1a shows an illuminator and its field of view;
FIG. 1b shows a first illuminated region of interest;
FIG. 1c shows a second illuminated region of interest;
FIG. 1d shows scanning of an illuminated region of interest;
FIG. 1e shows different sized illuminated regions of interest;
FIG. 2a shows a side view of an illuminator having a movable mirror element;
FIG. 2b shows the light source on the underside of the mechanical arm of FIG. 2a;
FIGS. 3a(i) and 3a(ii) illustrates changing the size of the illuminated region of interest by adjusting the distance between a lens and movable mirror element;
FIGS. 3b(i) and 3b(ii) illustrates that the direction of an emitted beam can be determined by adjusting the lateral offset of a movable mirror element with respect to a lens;
FIGS. 3c(i) and 3c(ii) illustrates that the direction of an emitted beam can be determined by tilting the angle of a movably mirror element;
FIGS. 3d(i) and 3d(ii) illustrates that the direction of emitted light can be concentrated in a particular direction or region through individual tilt manipulation of a plurality of mirrors;
FIG. 4a shows a first embodiment of an illuminator having a movable mirror element;
FIG. 4b shows a second embodiment of an illuminator having a movable mirror element;
FIG. 4c shows a third embodiment of an illuminator having a movable mirror element;
FIG. 5 shows a method performed by an illuminator having a movable mirror element;
FIG. 6a shows a first depiction of an embodiment of a camera system having a time-of-flight illuminator having a movable mirror element;
FIG. 6b shows a second depiction of the embodiment of FIG. 6a;
FIG. 7 shows an embodiment of a computing system.

DETAILED DESCRIPTION

A "smart illumination" time-of-flight system addresses some of the design challenges mentioned above. As will be made more clear in the following discussion, a "smart illumination" time-of-flight system can emit light on only a "region-of-interest" within the illuminator's field of view. As a consequence, the intensity of the emitted optical signal is strong enough to generate a detectable signal at the image sensor, while, at the same time, the illuminator's power consumption does not appreciably draw from the computer system's power supply.

One smart illumination approach is to use a movable mirror element to help collect and concentrate light from a light source into a more intense beam of light that can be directed to various regions of interest within the illuminator's field of view. A review of some features of this particular approach are discussed immediately below with respect to FIGS. 1a through 1d.

Referring to FIG. 1a, an illuminator 101 possesses a field of view 102 over which it has the ability to shine light. In certain situations and/or when operating in support of certain applications, the illuminator 101 may only direct light to a smaller region within the field of view 102. As an example, referring to FIG. 1b, only region 103 within the field of view 102 is illuminated. By contrast, as observed in FIG. 1c, only region 104 within the field of view is illuminated. In various embodiments, as discussed in more detail further below, the illuminated region can be directed to essentially any location within the field of view 102.

A challenge that "smart illumination" addresses is the desire to emit an optical signal having sufficient strength to generate a detectable signal at the image sensor, while, at the same time, avoiding excessive power consumption by the light source that generates the emitted light. One approach, therefore, is to effectively reduce the natural emission angle of a light source by collecting concentrating its divergent light through an objective lens to produce less divergent light (such as collimated or more focused light). The deliberate shaping of a less divergent emitted beam into a narrower beam effectively concentrates greater optical signal power onto a smaller region of interest 103, 104 within the illuminator's field of view.

Additionally, in cases where a larger illuminated region size is desired, smart illumination technology may "scan" the larger area with a smaller illuminated region. For example, as observed in FIG. 1d, if an application desires to illuminate larger area 105 within the field of view 102, the illuminator may effectively illuminate region 105 by scanning a smaller sized illuminated region across area 105. As depicted in FIG. 1d, at time t1 the illuminated region is centered at location 106, at time t2 the illuminated region is centered at location 107, at time t3 the illuminated region is centered at location 108 and at time t4 the illuminated region is centered at location 109. Here, so long as the information taken from the sensor is understood to span across a time period that extends approximately from time t1 to time t4, the illumination of larger sized region 105 can be comprehended even though a smaller sized illumination region was used.

Further still, as observed in FIG. 1e, in various embodiments, the size of the illuminated region 110, 111 itself may be varied. Generally, larger illuminated region size may be tolerated commensurate with the extent to which weaker received signal strength at the sensor can be tolerated (e.g., the object of interest is closer to the illuminator, there is less conflicting ambient light, etc.) and/or the extent to which the higher power consumption draw from the power supply can be tolerated. Of course, the larger the illuminated region, the less scanning activity that would need to be performed by the illuminator to effectively illuminate a larger region of interest. Conceivably, some situations may permit a single illuminated region to be large enough to fill the entire field of view 102.

Thus, to summarize, the illuminator 101 of FIG. 1a concentrates the optical power from its light source(s) over a smaller region of illumination to boost received signal strength at the receiver. Because the illuminator 101 illuminates a smaller region, the illuminator is designed with the ability to move the smaller illuminated region to various locations within the field of view 102. In some circumstances the illuminator 101 may scan the smaller illuminated region across a larger surface area to effectively illuminate the larger surface area. Additionally, the illuminator 101 may be designed to adjust the size of the illuminated region.

Which region of the field of view is to be illuminated, what size the illuminated region is to have and whether or not any scanning is to be performed is a function of the particular condition/situation of the computing system and/or the particular application that it is executing. Examples of some situations/conditions/applications include, to name a few, intelligent recognition of a person's face (e.g., for secure access to the computing system) or intelligent recognition of the formation of a person's hand (e.g., for a user interface of the computing system that supports hand gesture recognition). Here, the person's face or hand ("the object of interest") is apt to consume only a portion of the field of view 102.

FIGS. 2a and 2b depict a high level view of various illuminator embodiments that include a movable mirror element in order to direct the emitted beam to a particular location within the field of view. As observed in FIG. 2a, a light source 205 resides on or is at least mechanically coupled to the underside of a mechanical arm 204. In other embodiments, the light source may be fixed or mechanically coupled to other features such as the underside of a lens holder 202. The light 206 that is emitted from the light source 205 is directed to the surface of movable mirror element 203. The light that is reflected from the movable mirror element 203 is collected by lens 201 (or passes through an optical surface) and is emitted from the illuminator. A more thorough discussion on how various movements of the mirror element 203 can affect beam pointing and size is provided further below.

FIG. 2b shows an embodiment of the light source 205 (e.g., from the perspective of looking at the underside of the mechanical arm 204 of FIG. 2a). As observed in FIG. 2b the light source is implemented as a semiconductor chip 205 having an array of light source devices 207 such as an array of vertical cavity side emitting lasers (VCSELs) or an array of light emitting diodes (LEDs).

In a typical implementation the light sources of the array 207 emit non-visible (e.g., infra-red (IR)) light so that the reflected time-of-flight signal does not interfere with the traditional visible light image capture function of the camera system. Additionally, in various embodiments, each of the light sources within the array may be connected to the same anode and same cathode so that all of the light sources within the array are either all on or all off (alternative embodiments could conceivably be designed to permit subsets of light sources within an array to be turned on/off together).

An array of light sources tends to emit more uniform light than a single light source. Here, each light source (such as a single LED or VCSEL) by itself tends to emit non-uniform light. That is, the surface area of a region that is illuminated by a single LED or VCSEL will tend to have brighter spots and darker spots. By integrating a number of light sources into an array, emitted light from different devices tends to overlap resulting in dark spots from some light sources being irradiated by the bright spots of others. As such, the overall emitted light from the array tends to have a more uniform intensity profile.

Additionally, the individual light sources typically have a wide emitted light divergence angle. The wide divergence angle of the individual light sources results in a wide divergence angle from the light source array 207 as a whole. For a number of possible embodiments, after reflection from the mirror element 203, the objective lens 201 collects the diverging light and forms a beam of emitted light 207 that is collimated or that is converging or at least has a smaller divergence angle. Alternatively, in embodiments having a plurality of individually "tiltable" mirrors emitted light can be concentrated into a particular region by tilting different mirrors at different angles to condense the emitted light to a particular region within the illuminator.

Collecting and/or condensing diverging light from the light source array 204 and forming a beam of more concentrated light increases the optical intensity per unit area of the emitted beam which, in turn, results in a stronger received signal at the sensor. According to one calculation, if the divergence angle from the light source array is 60°, reducing the emitted beam's divergence angle to 30° will increase the signal strength at the sensor by a factor of 4.6. Reducing the emitted beam's divergence angle to 20° will increase the signal strength at the sensor by a factor of 10.7.

Boosting received signal strength at the sensor through optical concentration of the emitted light from the light source array 207 (as opposed to simply emitting higher intensity light from the light source array 204) preserves battery life as the light source array 207 will be able to sufficiently illuminate an object of interest without consuming significant amounts of power.

FIGS. 3a through 3c provide some basic examples/embodiments of how the size and location of the illuminated region can be affected through movement of the movable mirror element 203.

As observed in FIG. 3a, the size of the illuminated region can be adjusted by varying the vertical distance between the objective lens 301 and the mirror element 303. As discussed above, the objective lens 301 forms a more collimated beam from a diverging light source. As the movable mirror 303 moves closer to the lens 301 (FIG. 3a(i)), a narrower radius of the diverging light is collected by the lens resulting in an emitted beam shape having a narrower width. Contra-wise, as the movable mirror element 303 moves farther away from the lens 301 (FIG. 3a(ii)), a wider radius of the diverging light is collected from the light source array by the lens 301 resulting in an emitted beam shape having a wider width.

As observed in FIG. 3b, the location of the illuminated region within the field of view can be adjusted by varying the horizontal location of the mirror element 303 relative to the lens 301. In the specific approach of FIG. 3b, the position of the lens 301 is fixed and the mirror element 303 is controllably moved along a plane that resides parallel to and beneath the plane of the lens 303. Generally, the greater the mis-alignment between the mirror element 303 and the lens 301, the greater the pointing angle of the emitted beam from the illuminator. Additionally, the direction of the mis-alignment determines the pointing direction of the emitted beam. For example, as observed in FIG. 3b(i), misalignment in a first direction produces a beam that points along a first beam direction. By contrast, misalignment in a second opposite direction, as observed in FIG. 3b(ii), produces a beam that points along a second beam direction that is opposite that of the first beam direction.

The lateral movement of the mirror element 303 may necessitate the ability to move the light source so that the emitted light can "track" the positioning of the mirror 303. For example, referring briefly to FIG. 2a, as the mirror 203 moves farther away from the light source 205 along the −x direction, the tilt angle of the arm 204 may need to increase in order to ensure that the light that is emitted from the light source 205 reaches the mirror (likewise if the mirror moves closer to the light source along the +x direction the tilt angle may need to decrease). Similarly, as the mirror element 203 moves in either direction along the y axis the y positioning of the arm 204 may move along the y axis a same amount (or the arm can tilt about the x axis). Vertical movement of the mirror 303 relative to the lens 301, as in FIG. 3a, may be achieved without any light source movement by designing the lens 301 (and not the mirror element 303) to move in the vertical direction.

Any needed movement of the light source is a function of the optical design of the illuminator. Generally, a light source is less apt to need to be moved the less the mirror 303 moves and/or is designed to move. If light source movement is deemed appropriate, electro-mechanical devices (e.g., voice-coil actuators, electric motors coupled to drive gearing or other electro-mechanical devices can be coupled to the light source (e.g., through the mechanical arm) to effect such movement).

FIG. 3c shows a potentially more elegant solution in which the mirror element 303 is designed to "tilt" to effect a specific beam pointing. As observed in FIGS. 3c(i) and 3c(ii) the emitted beam will point approximately in a direction that is normal to the surface of the mirror 303. Thus, controlled tilting of the mirror 303 can be used to controllably direct the pointing of the beam that is emitted from the illuminator. The lens 301 may also be designed to move in the vertical (z) direction in order to change the cross sectional size of the emitted beam.

FIG. 3d shows that light can be concentrated, potentially without the use of a lens, by tilting a plurality of mirrors at different angles. For example, as observed in FIG. 3d(i), concentration of light toward a rightwise region can be accomplished by tilting a left side mirror 303_L less to the right and tilting a right side mirror 303_R more to the right than a mirror 303_M between them is tilted to the right. Likewise, as observed in FIG. 3d(ii) concentration of light toward a leftwise region can be accomplished by tilting a left side mirror 303_L less to the left and tilting a right side mirror 303_R more to the left than a mirror 303_M between them is tilted to the left. Because of the ability to concentrate light through the individual tilting of mirrors it is conceivable that a lens may not be used to further concentrate the light although many embodiments may choose to include a lens (e.g., for further concentration or focusing of the light).

Also, although individual tilting may be utilized to provide concentration of light as discussed above, it is also possible that a plurality of mirrors may be tilted at substantially the same angle (e.g., mirrors 303_L, 303_M and 303_R all tilt at a same angle) to effectively construct an optical path from the illuminator that behaves similarly with the principles discussed above with respect to FIG. 3c and, e.g., including the use of a lens.

FIG. 4a shows a movable mirror assembly for adjusting the lateral position of the mirror 403 relative to the lens 401. As observed in FIG. 4a, a pair of actuator voice coil motors 411, 412 each with spring return 414, (return spring for actuator 411 is blocked from view by arm 404) are used to define the position of the mirror 403 in each of the x and y dimensions, respectively. That is, one voice coil motor 412 and return spring 414 establish the x position of the mirror 403 and the other voice coil motor 411 and return spring (not observable) establish the y position of the mirror 403.

Each actuator 411, 412 includes a respective inner member 416, 417 that protrudes inwardly or outwardly based on the electro-motive force of the voice coil motor. That is, the position along a particular axis of the mirror 403 is defined by the motor force applied by the respective inner members 416, 417 against their respective return springs through the lower platform 410 on which the mirror 403 is affixed. The motor force is defined by a voltage applied to the motor's coil. In a typical implementation the coil is integrated with the inner respective inner member 416, 417 and the surrounding outer member of the motor includes a permanent magnet. A magnetic field responsive to a current driven through the coil interacts with the permanent magnet's magnetic field which determines the force applied to the inner member. Here, voice-coil motors with spring return typically have a direct current-position relationship and therefore do not require a positioning sensor for feedback control.

FIG. 4b shows a movable lens assembly that is designed to adjust a tilt angle of the mirror 403 such that the plane of the mirror 403 can be made to face in any pointing direction. Here, a pair of voice coil motors 421, 422 each with spring return 424, 425 are used as actuators to define the vertical position of each of two points along the outer edge of a tiltable platform 420 that the mirror is affixed to. The tilt angle of the mirror/platform about the x axis is substantially defined by the force of a first motor 421 as applied against its return spring 424. The tilt angle of the mirror/platform about the y axis is substantially defined by the force of a second motor 422 as applied against its return spring 425. From these basic scenarios, any tilt angle for the mirror/platform can be established as a function of the respective forces applied by the motors and the counteractive forces applied by the springs.

FIG. 4c shows another tiltable mirror embodiment in which the tilting of mirrors is effected by a one or microelectromechanical system (MEMS) mirror(s). As depicted in FIG. 4c, the tiltable mirror assembly is implemented as an array of MEMs mirrors 431. In other embodiments an arrangement of MEMs mirrors in other than an array or only a single MEMs mirror may be implemented. The MEMs mirrors 431 may be fixed in a stationary or movable frame 430 depending on implementation. If the frame 430 is movable, it may, e.g., be implemented as a tiltable platform such as the tiltable platform 420 of FIG. 4b.

As is known in the art, a MEMs mirror may be implemented so as to be tiltable around a single axis. For example, as depicted in FIG. 4c, each MEMS mirror of the array 431 may only tilt about the y axis. By itself this would mean that the beam pointing could only be directed along the x axis. However, a turntable motor 432 may be coupled to the underside of the frame 430 to effectively rotate the axis about which the MEMS mirrors 431 can tilt. With the action of the turntable motor 432, the beam can be made to point in any direction. MEMS mirror technologies that can effect mirror tilt along more than a single axis may cause integration of a turntable motor 432 having a reduced angular swing range or eliminate the motor entirely depending on the rotational range of the MEMS devices themselves.

The MEMs approach of FIG. 4c can be designed consistent with the discussion of FIG. 3d in which multiple mirrors within the array are tilted at different angles with respect to one another to effect concentration of the emitted light. Here lens 401 may be used, e.g., to further concentrate or focus the emitted light, or, lens 401 may be eliminated and, e.g., replaced with another optical surface such as a window.

Although the discussion above has emphasized the use of voice-coil motors, other embodiments may use other devices such as piezoelectric actuators or stepper motors.

FIG. 5 shows a method performed by a time-of-flight camera system illuminator. The method includes emitting light from a light source and impinging the light upon one or more tiltable mirrors. The light also includes tilting the one or more tiltable mirrors to direct the light to only a region of the illuminator's field of view.

FIGS. 6a and 6b show an integrated traditional camera and time-of-flight imaging system 600. FIG. 6b provides a more detailed depiction with the illuminator housing being removed. The system has a connector 601 for making electrical contact, e.g., with a larger system/mother board, such as the system/mother board of a laptop computer, tablet computer or smartphone. Depending on layout and implementation, the connector 601 may connect to a flex cable that, e.g., makes actual connection to the system/mother board or the connector 601 may make contact to the system/mother board directly.

The connector 601 is affixed to a planar board 602 that may be implemented as a multi-layered structure of alternating conductive and insulating layers where the conductive layers are patterned to form electronic traces that support the internal electrical connections of the system 600.

An integrated "RGBZ" image sensor 603 is mounted to the planar board 602. The integrated RGBZ image sensor includes different kinds of pixels, some of which are sensitive to visible light (e.g., a subset of R pixels that are sensitive to red visible blue light, a subset of G pixels that are sensitive to visible green light and a subset of B pixels that are sensitive to blue light) and others of which are sensitive to IR light. The RGB pixels are used to support traditional "2D" visible image capture (traditional picture taking) functions. The IR sensitive pixels are used to support 2D IR image capture and 3D depth profile imaging using time-of-flight techniques. Although a basic embodiment includes RGB pixels for the visible image capture, other embodiments may use different colored pixel schemes (e.g., Cyan, Magenta and Yellow).

The integrated image sensor 603 may also include, for the IR sensitive pixels, special signaling lines or other circuitry to support time-of-flight detection including, e.g., clocking signal lines and/or other signal lines that indicate the timing of the reception of IR light (in view of the timing of the emission of the IR light from the light source).

The integrated image sensor 603 may also include a number or analog-to-digital converters (ADCs) to convert the analog signals received from the sensor's RGB pixels into digital data that is representative of the visible imagery in front of the camera lens module 604. The planar board 602 may likewise include signal traces to carry digital information provided by the ADCs to the connector 601 for processing by a higher end component of the computing system, such as an image signal processing pipeline (e.g., that is integrated on an applications processor).

A camera lens module 604 is integrated above the integrated RGBZ image sensor 603. The camera lens module 604 contains a system of one or more lenses to focus light received through an aperture onto the image sensor 603. As the camera lens module's reception of visible light may interfere with the reception of IR light by the image sensor's time-of-flight pixels, and, contra-wise, as the camera module's reception of IR light may interfere with the reception of visible light by the image sensor's RGB pixels, either or both of the image sensor 603 and lens module 604 may contain a system of filters (e.g., filtering 610) arranged to substantially block IR light that is to be received by RGB pixels, and, substantially block visible light that is to be received by the time-of-flight pixels.

An illuminator 607 composed of a movable mirror assembly 615 and mechanical arm 614 having a light source affixed on its underside is also mounted on the planar board 601. Embodiments of an illuminator having a movable mirror have been discussed above with respect to FIGS. 1 through 4a,b,c.

Notably, one or more supporting integrated circuits for the light source of the illuminator (not shown in FIG. 6) may be mounted on the planar board 602. The one or more integrated circuits may include LED or laser driver circuitry for driving respective currents through the light source array's light source devices and coil driver circuitry for driving each of the coils associated with the voice coil motors of the movable mirror assembly. Both the LED or laser driver circuitry and coil driver circuitry may include respective digital-to-analog circuitry to convert digital information received through connector 701 into a specific current drive strength for the light source or a voice coil. The laser driver may additionally including clocking circuitry to generate a clock signal or other signal having a sequence of 1s and 0s that, when driven through the light source will cause the light source to repeatedly turn on and off so that the depth measurements can repeatedly be made.

In an embodiment, the integrated system 600 of FIGS. 6a and 6b support three modes of operation: 1) 2D mode; 3) 3D mode; and, 3) 2D/3D mode. In the case of 2D mode, the system behaves as a traditional camera. As such, illuminator 607 is disabled and the image sensor is used to receive visible images through its RGB pixels. In the case of 3D mode, the system is capturing time-of-flight depth information of an object in the field of view of the illuminator 607 and the camera lens module 604. As such, the illuminator 607 is enabled and emitting IR light (e.g., in an on-off-on-off . . . sequence) onto the object. The IR light is reflected from the object, received through the camera lens module 604 and sensed by the image sensor's time-of-flight pixels. In the case of 2D/3D mode, both the 2D and 3D modes described above are concurrently active.

FIG. 7 shows a depiction of an exemplary computing system 700 such as a personal computing system (e.g., desktop or laptop) or a mobile or handheld computing system such as a tablet device or smartphone. As observed in FIG. 7, the basic computing system may include a central processing unit 701 (which may include, e.g., a plurality of general purpose processing cores 715_1 through 715_N and a main memory controller 717 disposed on an applications processor), system memory 702, a display 703 (e.g., touch-screen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller), an I/O control function 718 and one or more image signal processor pipelines 719. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702 to write/read data to/from system memory 702. The image signal processing pipelines 719 receive image information from the camera 710 and process the raw image information for downstream uses. The power management control unit 712 generally controls the power consumption of the system 700.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750.

In an embodiment one or more cameras 710 includes an integrated traditional visible image capture and time-of-flight depth measurement system such as the system 600 described above with respect to FIGS. 6a and 6b. Application software, operating system software, device driver software and/or firmware executing on a general purpose CPU core (or other functional block having an instruction execution pipeline to execute program code) of an applications processor or other processor may direct commands to and receive image data from the camera system.

In the case of commands, the commands may include entrance into or exit from any of the 2D, 3D or 2D/3D system states discussed above with respect to FIGS. 6a and 6b. Additionally, commands may be directed to the movable mirror assembly of the illuminator to effect specific pointing directions of the emitted light.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:
1. An depth camera comprising:
an illuminator comprising:
    an arm,
    a moveable mirror element,
    a light source that directs light from an underside of the arm toward the moveable mirror element,
    an optical surface through which the light that is directed from the light source toward the moveable mirror element and that reflects off of the moveable mirror element passes, and
    one or more actuators that are each configured to adjust the moveable mirror element in a lateral position along an X-axis or a Y-axis relative to the optical surface; and an image sensor for detecting the light that reflects off of an object within a field of view of the depth camera.

2. The depth camera of claim 1, wherein the light source comprises an array of light emitting diodes (LEDs) or vertical cavity side emitting lasers (VCSELs).

3. The depth camera of claim 1, wherein the moveable mirror element is mounted on a moveable platform.

4. The depth camera of claim 1, comprising two return springs that are each configured to oppose a force exerted by one of the one or more actuators.

5. The depth camera of claim 3, comprising two actuators that are positioned on different, outside edges of the movable platform, and that are each configured to adjust a vertical position of the movable platform.

6. The depth camera of claim 3, wherein the movable mirror element comprises an array of micro-electromechanical system (MEMS) mirrors.

7. The depth camera of claim 6, comprising a turntable motor that is positioned beneath the movable platform, and that is configured to rotate the movable platform around an axis associated with the MEMS mirrors.

8. A computer-implemented method comprising:
activating a light source that directs light from an underside of an arm of an illuminator of a depth camera toward a movable mirror element of the illuminator of the depth camera; and
adjusting the movable mirror element to direct the light to pass through an optical surface of the illuminator of the depth camera,
wherein the movable mirror element is adjusted using one or more actuators that are each configured to adjust the moveable mirror element in a lateral position along an X-axis or a Y-axis relative to the optical surface.

9. The method of claim 8, wherein the light source comprises an array of light emitting diodes (LEDs) or vertical cavity side emitting lasers (VCSELs).

10. The method of claim 8, wherein the moveable mirror element is mounted on a moveable platform.

11. The method of claim 8, wherein the movable mirror element is adjusted using two return springs that are each configured to oppose a force exerted by one of the one or more actuators.

12. The method of claim 10, wherein the movable mirror element is adjusted using two actuators that are positioned on different, outside edges of the movable platform, and that are each configured to adjust a vertical position of the movable platform.

13. The method of claim 10, wherein the movable mirror element comprises an array of micro-electromechanical system (MEMS) mirrors.

14. The method of claim 13, wherein the movable mirror element is adjusted using a turntable motor that is positioned beneath the movable platform, and that is configured to rotate the movable platform around an axis associated with the MEMS mirrors.

15. A non-transitory computer readable storage medium encoded with a computer program, the program comprising instructions that when executed by data processing apparatus cause the data processing apparatus to perform operations comprising:
activating a light source that directs light from an underside of an arm of an illuminator of a depth camera toward a movable mirror element of the illuminator of the depth camera; and
adjusting the movable mirror element to direct the light to pass through an optical surface of the illuminator of the depth camera,
wherein the movable mirror element is adjusted using one or more actuators that are each configured to adjust the moveable mirror element in a lateral position along an X-axis or a Y-axis relative to the optical surface.

16. The medium of claim 15, wherein the light source comprises an array of light emitting diodes (LEDs) or vertical cavity side emitting lasers (VCSELs).

17. The medium of claim 15, wherein the moveable mirror element is mounted on a moveable platform.

* * * * *